United States Patent
Maruyama (10) Patent No.: US 9,956,513 B2
(45) Date of Patent: May 1, 2018

(54) AIR CLEANER CASING, AIR CLEANER, AND METHOD FOR MANUFACTURING AIR CLEANER CASING

(71) Applicant: TOYOTA BOSHOKU KABUSHIKI KAISHA, Aichi-ken (JP)

(72) Inventor: Kazushige Maruyama, Nagoya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 86 days.

(21) Appl. No.: 14/848,450

(22) Filed: Sep. 9, 2015

(65) Prior Publication Data
US 2016/0074793 A1 Mar. 17, 2016

(30) Foreign Application Priority Data
Sep. 17, 2014 (JP) ................. 2014-189152

(51) Int. Cl.
*B01D 46/10* (2006.01)
*B01D 46/00* (2006.01)
*B01D 46/52* (2006.01)

(52) U.S. Cl.
CPC ....... *B01D 46/0002* (2013.01); *B01D 46/521* (2013.01)

(58) Field of Classification Search
CPC ............ B01D 46/0001; B01D 46/0002; B01D 46/0004; B01D 46/0005; B01D 46/10; B01D 46/0049; B01D 46/0063; B01D 46/00
USPC ...... 55/385.3, 498, 502, 490, 497, 504, 521, 55/511, 503, 495, DIG. 5; 123/198 E; 210/435; 454/158
See application file for complete search history.

(56) References Cited

U.S. PATENT DOCUMENTS

| 4,692,177 A | 9/1987 | Wright et al. | |
| 5,605,554 A * | 2/1997 | Kennedy | B01D 46/0004 123/198 E |
| 6,159,260 A * | 12/2000 | Hammes | B01D 46/10 55/490 |
| 6,293,984 B1 * | 9/2001 | Oda | B01D 46/10 55/497 |
| 8,409,312 B2 * | 4/2013 | Gorg | B01D 46/0063 123/198 E |

(Continued)

FOREIGN PATENT DOCUMENTS

JP 58-155215 9/1983

OTHER PUBLICATIONS

Office Action issued in Japan Counterpart Patent Appl. No. 2014-189152, dated Jul. 11, 2017, along with an English translation thereof.

*Primary Examiner* — Robert A Hopkins
*Assistant Examiner* — Minh-Chau Pham
(74) *Attorney, Agent, or Firm* — Greenblum & Bernstein, P.L.C.

(57) ABSTRACT

An air cleaner includes an upper casing, which has an inlet, a lower casing, which has an outlet and covers the lower opening of the upper casing, and a filter element, which is located inside the upper casing and the lower casing. The lower casing includes a looped application surface, on which an adhesive is applied to adhere the filter element, and a minute protrusion, which extends along the perimeter, is formed on the inner peripheral edge of the application surface.

8 Claims, 6 Drawing Sheets

(56) References Cited

U.S. PATENT DOCUMENTS

| | | | |
|---|---|---|---|
| 2002/0020156 A1* | 2/2002 | Goerg | B01D 46/0002 55/385.3 |
| 2006/0026935 A1* | 2/2006 | Huang | B01D 46/0046 55/337 |
| 2006/0080949 A1* | 4/2006 | Moriyama | B01D 46/0049 55/490 |
| 2011/0308214 A1* | 12/2011 | Jessberger | B01D 46/0005 55/502 |
| 2015/0020489 A1* | 1/2015 | Sudermann | B01D 46/0001 55/502 |

* cited by examiner

Fig.1

Combustion Chamber

AIR CLEANER CASING, AIR CLEANER, AND METHOD FOR MANUFACTURING AIR CLEANER CASING

BACKGROUND OF THE INVENTION

The present invention relates to an air cleaner casing that has a looped application surface to which an adhesive for securing a filter element is applied. The present invention also relates to an air cleaner that includes the casing and to a method for manufacturing the air cleaner casing.

Such an air cleaner has been disclosed in, for example, Japanese Laid-Open Patent Publication No. 58-155215. The air cleaner disclosed in the above publication includes a cylindrical filter element located in a cylindrical casing. The filter element includes a cylindrical filter and a disk-like support frame located at an end of the filter. The outer peripheral edge of the support frame is secured to a looped step portion formed on the inner surface of the casing with an adhesive. The opening at an end of the casing is covered with a cover. The cover is secured to the end of the casing with an adhesive or by ultrasonic welding.

Like the air cleaner of Japanese Laid-Open Patent Publication No. 58-155215, air cleaners that have a looped application surface such as a step portion for applying an adhesive to the casing may possibly have the following problem. That is, since the adhesive has flowability, the adhesive applied to the application surface may flow out to the inner side. Thus, the adhesive does not stay on the application surface, and it is difficult to secure the filter element in a stable manner. However, in order to keep the adhesive on the application surface, the amount of adhesive used is increased.

SUMMARY OF THE INVENTION

Accordingly, it is an objective of the present invention to provide an air cleaner that reduces the amount of adhesive required to secure a filter element and a method for manufacturing an air cleaner casing.

To achieve the foregoing objective and in accordance with one aspect of the present invention, an air cleaner casing is provided that includes a looped application surface, on which an adhesive is applied to secure a filter element, and a minute protrusion, which is formed on an inner side of the application surface to extend along a perimeter.

In accordance with another aspect of the present invention, an air cleaner is provided that includes a first casing, a second casing, and a filter element. The first casing includes an opening and one of an inlet and an outlet. The second casing includes the other of the inlet and the outlet and covers the opening of the first casing. The filter element is located inside the first casing and the second casing. The second casing includes a looped application surface, on which an adhesive is applied to secure the filter element, and a minute protrusion, which is formed on an inner side of the application surface to extend along a perimeter.

According to the above configuration, since the minute protrusion is provided, the surface of the adhesive applied to the application surface tends to be rounded by surface tension. Thus, the adhesive applied to the application surface is restrained from moving toward the inner side, and the adhesive is easily retained on the application surface. Thus, the filter element is secured in a stable manner with a small amount of the adhesive.

In a further aspect of the present invention, a method for manufacturing an air cleaner casing including a looped application surface, on which an adhesive is applied to secure a filter element, is provided. The method includes: molding the casing with a mold; and forming a minute protrusion, which extends along a perimeter, on an inner side of the application surface with a parting surface of the mold when molding the casing.

According to the above-described method, the minute protrusion is formed by the parting surface of the mold when molding the casing. Thus, only a small design change is required in the mold for forming the minute protrusion. This allows the casing to be easily formed.

DETAILED DESCRIPTION OF THE PREFERRED EMBODIMENTS

One embodiment will now be described with reference to FIGS. 1 to 9.

Figure 1:
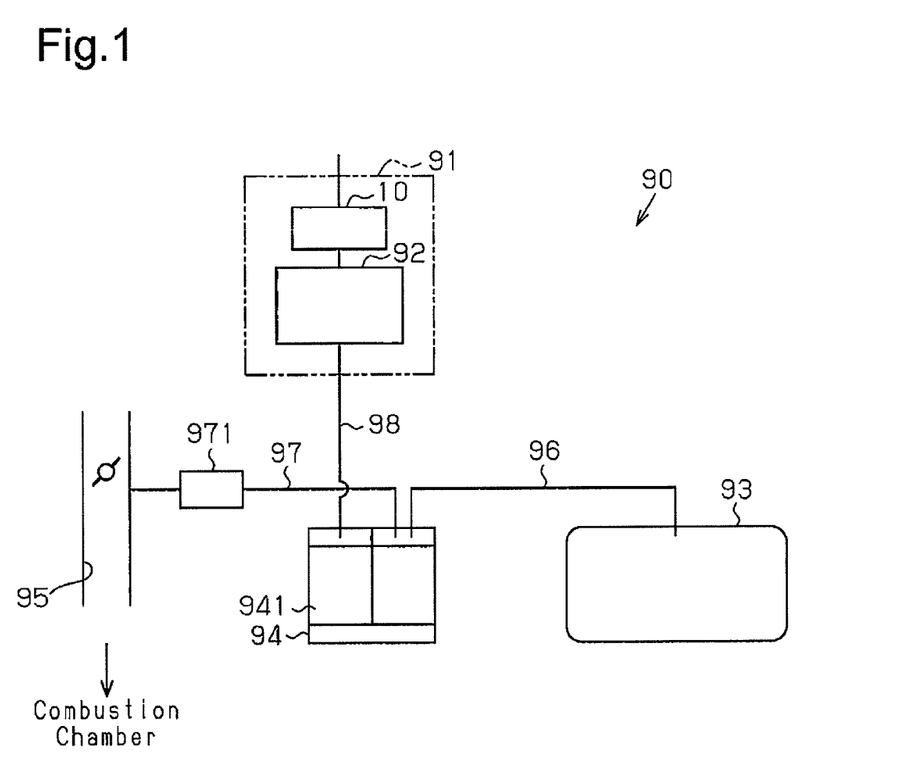
FIG. 1 is a schematic diagram illustrating the configuration of a fuel vapor processing system to which an air cleaner according to one embodiment is applied.

As shown in FIG. 1, a vehicle-mounted internal combustion engine includes a fuel vapor processing system (hereinafter, referred to as a processing system 90) for introducing fuel vapor in a fuel tank 93 to an intake passage 95 of the internal combustion engine and processing the fuel vapor.

The fuel tank 93 is connected to a first end of a canister 94 via a vapor passage 96. The canister 94 accommodates an adsorbent 941, which adsorbs fuel components. The first end of the canister 94 is connected to the intake passage 95 via a purge passage 97. A control valve 971 is located in the middle of the purge passage 97. An introduction passage 98, which introduces air into the canister 94, is connected to a second end of the canister 94.

The processing system 90 introduces gas containing fuel vapor in the fuel tank 93 into the canister 94 via the vapor passage 96, and fuel components included in the gas are adsorbed by the adsorbent 941 in the canister 94. Gas including the fuel components the concentration of which is reduced to a problem-free level is discharged to the atmosphere through the introduction passage 98.

In the processing system 90, when the control valve 971 is opened during operation of the internal combustion engine, the negative pressure in the intake passage 95 causes the gas in the canister 94 to be drawn into the intake passage 95 through the purge passage 97 and air to be introduced to the canister 94 through the introduction passage 98. At this time, the fuel components that have been adsorbed by the adsorbent 941 are desorbed from the adsorbent 941, and the fuel components mix with air to form purge gas, which is introduced to the intake passage 95. Desorbing the fuel components that have been adsorbed by the canister 94 and introducing the purge gas to the intake passage 95 as described above restore the ability of the canister 94 to adsorb fuel components. The purge gas introduced to the intake passage 95 is burned in the combustion chambers of the internal combustion engine.

A detection module 91, which detects a presence/absence of leakage of fuel vapor from the fuel tank 93, is connected to the introduction passage 98. The detection module 91 includes a known detection device 92, which includes a pressure sensor, and an air cleaner 10, which filters air that is introduced into the detection device 92.

Figure 2:
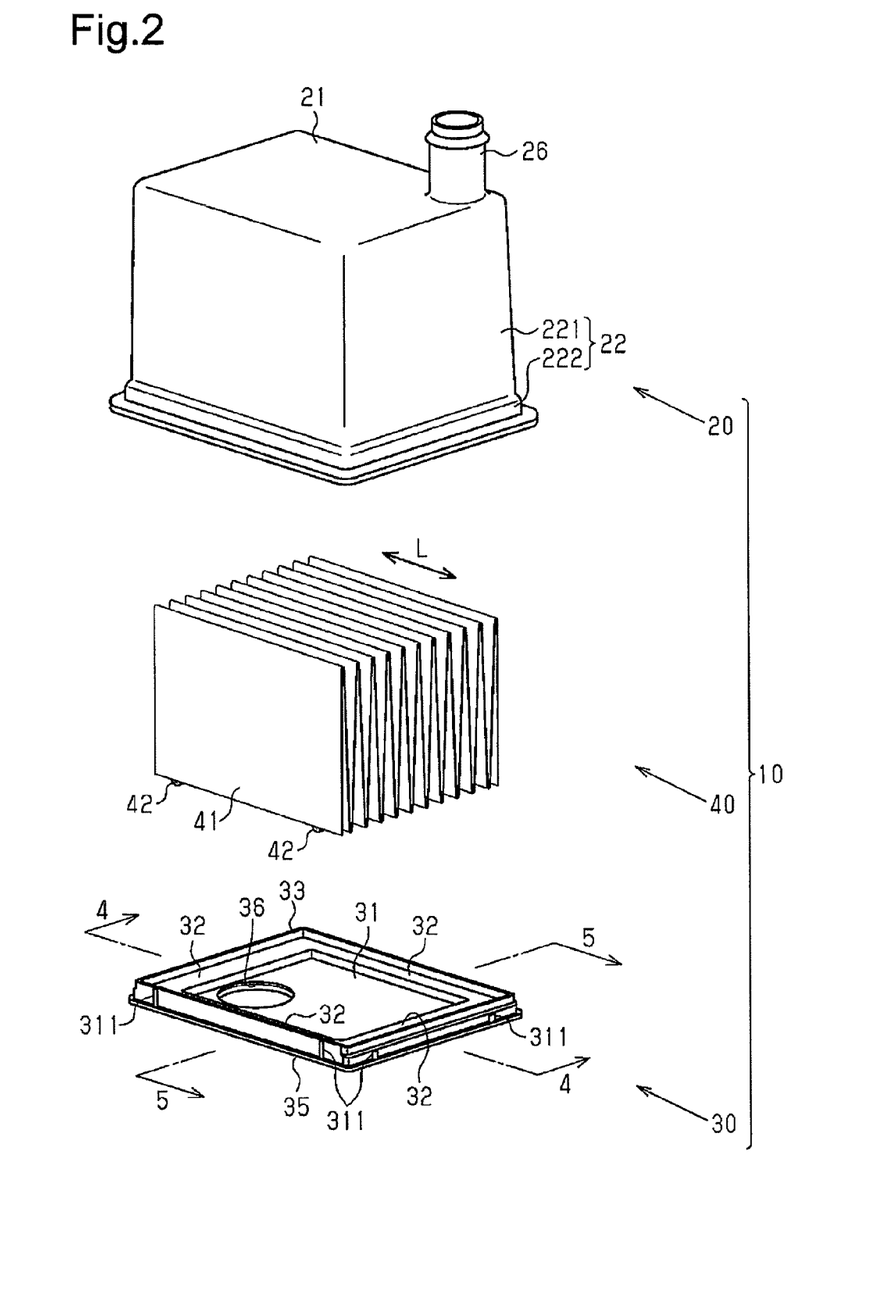
FIG. 2 is an exploded perspective view of the air cleaner of the system shown in FIG. 1.
Figure 4:
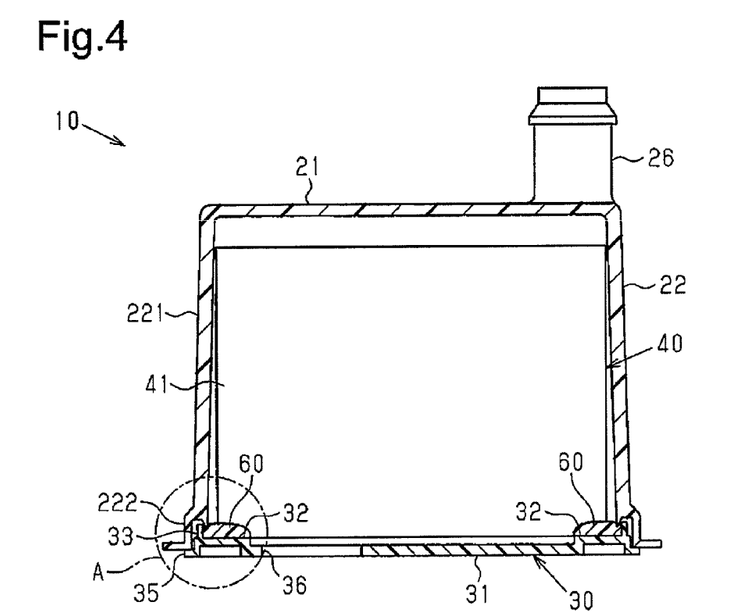
FIG. 4 is a cross-sectional view taken along line 4-4 of FIG. 2.
Figure 5:
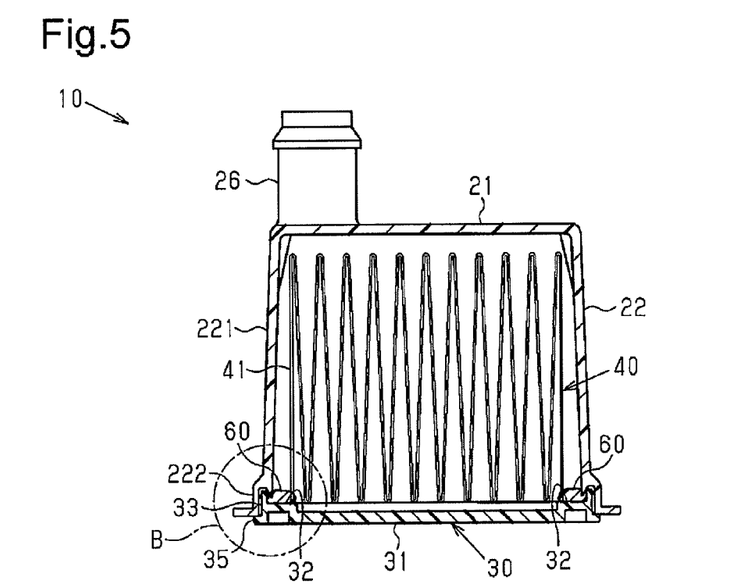
FIG. 5 is a cross-sectional view taken along line 5-5 of FIG. 2.

As shown in FIGS. 2, 4, and 5, the air cleaner 10 includes an upper casing 20, which has a lower opening, a lower casing 30, which covers the lower opening of the upper casing 20, and a filter element 40, which is located inside the upper casing 20 and the lower casing 30. The upper casing 20 and the lower casing 30 are formed of rigid synthetic plastic material.

Figure 6:
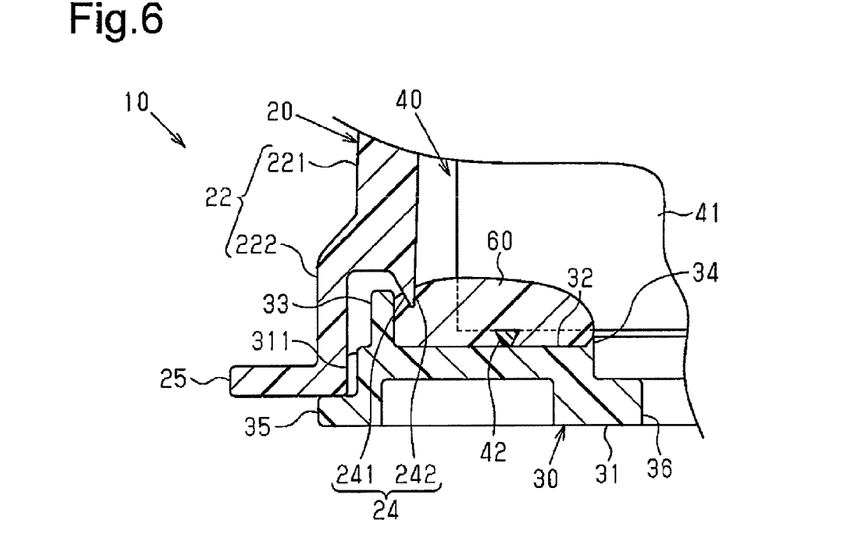
FIG. 6 is an enlarged cross-sectional view of part A in FIG. 4.
Figure 7:
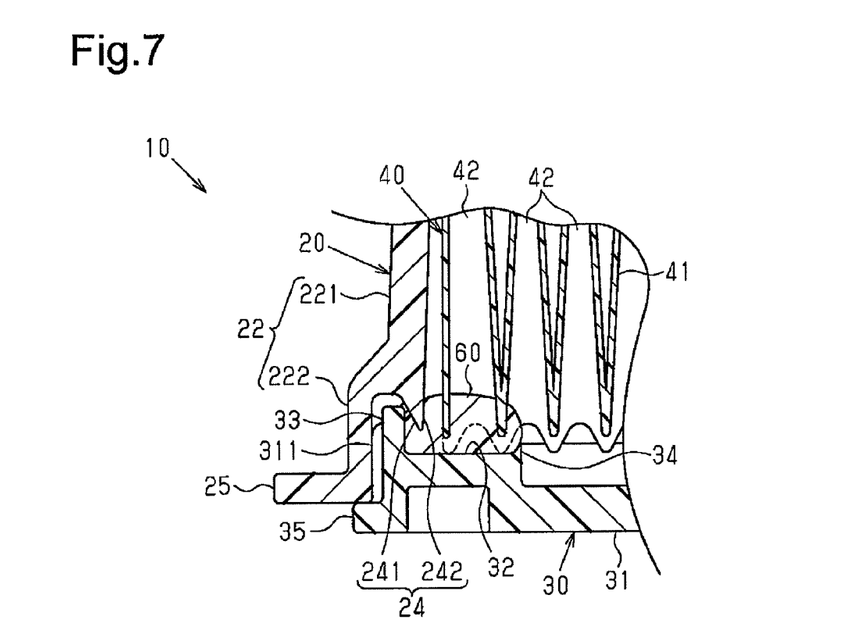
FIG. 7 is an enlarged cross-sectional view of part B in FIG. 5.

As shown in FIGS. 2, 4, and 6, the lower casing 30 includes a bottom wall 31, which is rectangular in a plan view, and the bottom wall 31 includes a circular hole-like outlet 36. As shown in FIGS. 2, and 4 to 7, a rectangular looped application surface 32 is formed on the outer peripheral portion of the bottom wall 31. The application surface 32 is formed to be one-step higher than the upper surface of the bottom wall 31 in which the outlet 36 is formed. As shown in FIGS. 6 and 7, a minute protrusion 34, which extends along the perimeter, is formed on the inner peripheral edge of the application surface 32 along the entire perimeter.

As shown in FIGS. 2, and 4 to 7, a wall portion 33 projects from the outer perimeter of the application surface 32 along the entire perimeter. Furthermore, projections 311 that are shaped as semi-circular columns and extend in the vertical direction are formed on the outer peripheral surface of the bottom wall 31 at intervals along the perimeter. A flange 35 is formed on the outer peripheral edge of the lower end of the bottom wall 31 along the entire perimeter.

Figure 3:
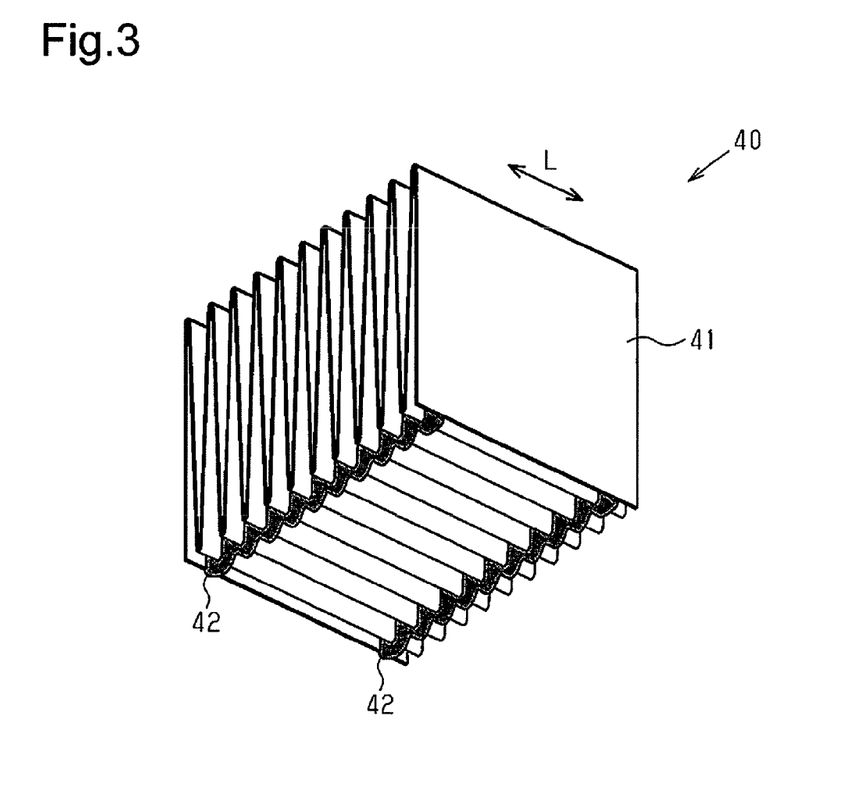
FIG. 3 is a perspective view of a filter element of the air cleaner in FIG. 2.

As shown in FIGS. 6 and 7, for example, a polyurethane-based hot-melt adhesive (hereinafter, simply referred to as an adhesive 60) is applied to the application surface 32 of the lower casing 30. As shown in FIGS. 2 and 3, the filter element 40 includes a rectangular filter 41, which has pleats formed by folding a filter paper. As shown in FIG. 3, sealing members 42, which seal the end portions of the ridges of the pleats in an extending direction L, are located between the pleats at the bottom part of the filter 41. The sealing members 42 are located at positions slightly inward of the ends in the extending direction L. As shown in FIGS. 3, 6, and 7, the sealing members 42 project downward from the lower end of the filter 41, that is, toward the application surface 32. Like the adhesive 60, the sealing member 42 is formed of a polyurethane-based hot-melt adhesive.

As shown in FIGS. 6 and 7, the amount of projection of the minute protrusion 34 from the application surface 32 is set smaller than the amount of projection of the sealing members 42 from the lower end of the filter 41, and thus a gap is formed between the minute protrusion 34 and the lower end of the filter 41. With the lower end of the sealing members 42 abutting against the application surface 32, the outer peripheral portion of the lower end of the filter element 40 is secured to the application surface 32 with the adhesive 60. Since the sealing members 42 seal between the pleats at the bottom part of the filter 41, and the outer peripheral portion of the lower end of the filter element 40 is secured to the application surface 32 with the adhesive 60, the section between the lower casing 30 and the filter element 40 is sealed.

As shown in FIGS. 2, 4 and 5, the upper casing 20 includes a rectangular tubular peripheral wall 22 and an upper wall 21, which covers the top of the peripheral wall 22. A cylindrical inlet 26 projects from the upper wall 21.

As shown in FIGS. 2, and 4 to 7, the inner surface and the outer surface of a lower end section 222 of the peripheral wall 22 are located outward of the inner surface and the outer surface of an upper section 221. As shown in FIGS. 6 and 7 in an enlarged view, a protrusion 24, which extends downward, is formed on the inner surface of the upper section 221 of the peripheral wall 22 along the entire perimeter. An inner side surface 242 of the protrusion 24 is formed on the same plane as the inner surface of the upper section 221 of the peripheral wall 22. Furthermore, an outer side surface 241 of the protrusion 24 is inclined such that the outer side surface 241 approaches the inner perimeter toward the lower end. Thus, the cross-section of the protrusion 24 tapers downward.

The protrusion 24 is located inward of the wall portion 33 of the lower casing 30 and outward of the filter element 40 and is inserted into the adhesive 60 along the entire perimeter. The wall portion 33 of the lower casing 30 is located between the lower end section 222 of the peripheral wall 22 and the protrusion 24 with gaps. That is, the wall portion 33 is covered with the lower end section 222 of the peripheral wall 22 with a gap from the outer side. The projections 311 of the lower casing 30 contact the inner peripheral surface of the lower end section 222 of the peripheral wall 22. A flange 25 is formed on the outer peripheral edge of the lower opening of the peripheral wall 22 along the entire perimeter, and the lower surface of the flange 25 contacts the upper surface of the flange 35 of the lower casing 30.

A method for manufacturing the lower casing 30 will now be described.

Figure 8:
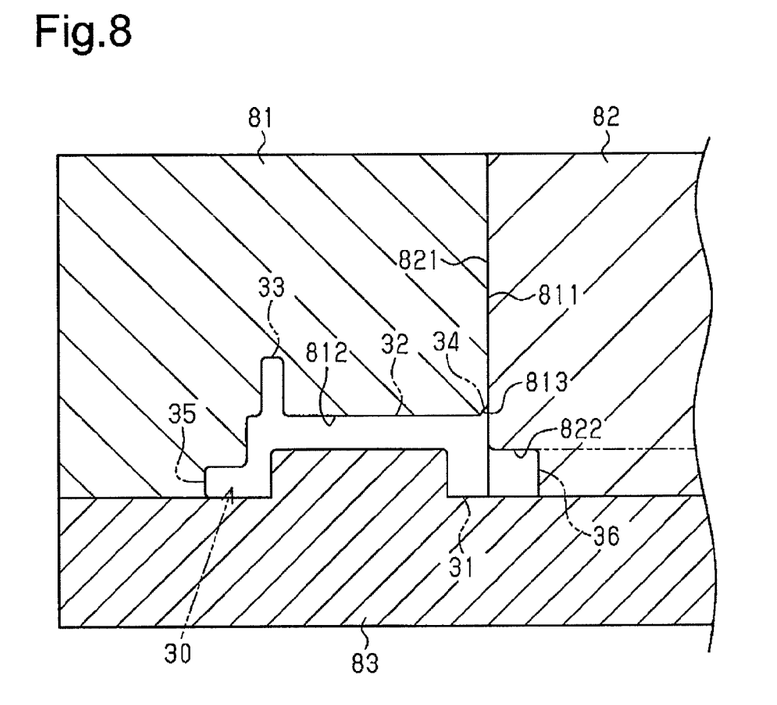
FIG. 8 is a partial cross-sectional view of first to third molds for molding the lower casing.

As shown in FIG. 8, a first mold 81 includes a recess 812, which is shaped to correspond to the application surface 32, the wall portion 33, and the upper surface and the outer peripheral surface of the flange 35 of the lower casing 30. A second mold 82 includes a recess 822, which is shaped to correspond to the upper surface of the lower casing 30 inward of the application surface 32 and the outlet 36. The second mold 82 is located adjacent to and inward of the first mold 81. The recess 812 of the first mold 81 includes a chamfered portion 813 adjacent to the outer peripheral surface of the second mold 82 and is shaped to correspond to the minute protrusion 34. A third mold 83 includes a protrusion that is shaped to correspond to the back surface of the application surface 32. The recesses 812, 822 and the protrusion form a cavity.

The lower casing 30 is manufactured by injection molding using the first to third molds 81 to 83. At this time, the minute protrusion 34 is formed by the chamfered portion 813 formed on a parting surface 811 of the first mold 81 and a parting surface 821 of the second mold 82.

The procedure for assembling the air cleaner 10 will now be described.

First, the adhesive 60, which has been heated and melted, is applied to the application surface 32 of the lower casing 30. Subsequently, the outer peripheral portion of the lower end surface of the filter element 40 is mounted on the application surface 32 on which the adhesive 60 is applied. The lower end section 222 of the peripheral wall 22 of the upper casing 20 is then fitted to the projections 311 formed on the outer peripheral surface of the bottom wall 31 of the lower casing 30, and the flange 25 of the upper casing 20 is brought into contact with the flange 35 of the lower casing 30. At this time, the protrusion 24 of the upper casing 20 is inserted into the adhesive 60.

Operation of the present embodiment will now be described.

Figure 9:
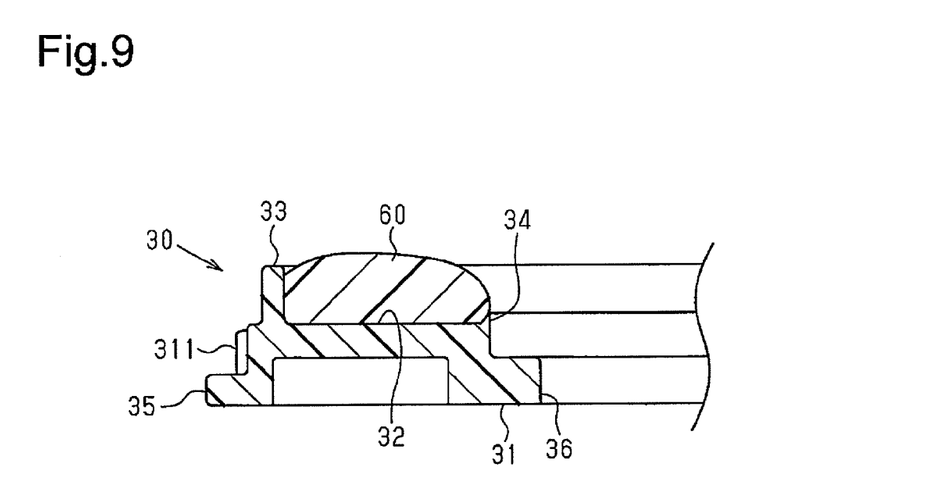
FIG. 9 is a cross-sectional view of the lower casing in a state in which an adhesive is applied to an application surface.

As shown in FIG. 9, the minute protrusion 34, which extends along the entire perimeter, is located on the inner peripheral edge of the application surface 32 of the lower casing 30. Thus, the surface of the adhesive 60 applied to the application surface 32 tends to be rounded by surface tension. This allows the adhesive 60 applied to the application surface 32 to be restrained from moving inward and to be easily retained on the application surface 32. Therefore, the filter element 40 is secured in a stable manner with a small amount of the adhesive 60.

Furthermore, since the adhesive 60 applied to the application surface 32 is restrained from flowing down to the inner side, the adhesive 60 is restrained from adhering to a clean region such as the inner peripheral surface of the outlet 36 and becoming a foreign matter.

The air cleaner casing, the air cleaner, and the method for manufacturing the air cleaner casing according to the present embodiment have the following advantages.

(1) The lower casing 30 has the looped application surface 32, to which the adhesive 60 for securing the filter element 40 is applied. The minute protrusion 34, which extends along the perimeter, is formed on the inner side of the application surface 32.

With this configuration, the minute protrusion 34 allows the surface of the adhesive 60 applied to the application surface 32 to be easily rounded by surface tension. This allows the adhesive 60 applied to the application surface 32 to be restrained from moving toward the inner side and to be easily retained on the application surface 32. Therefore, the filter element 40 is secured in a stable manner with a small amount of the adhesive 60. The amount of the adhesive 60 necessary for securing the filter element 40 can be reduced, accordingly.

(2) Since the minute protrusion 34 is formed along the entire perimeter, the adhesive 60 applied to the application surface 32 is restrained from moving inward along the entire perimeter. Thus, the adhesive 60 is suitably retained on the application surface 32.

(3) The minute protrusion 34 is formed on the inner peripheral edge of the application surface 32. Thus, the minute protrusion 34 can be formed with the chamfered portion 813 formed on the parting surface 811 of the first mold 81, which corresponds to the application surface 32 of the lower casing 30, and the parting surface 821 of the second mold 82, which is located adjacent to the inner side of the first mold 81. Thus, only a minor design change in the first mold 81 is required to form the minute protrusion 34. Since a burr formed by the parting surfaces 811, 821 of the first and second molds 81, 82 functions as part of the minute protrusion 34, a process to remove the burr is unnecessary. Thus, the lower casing 30 is easily formed.

(4) The projection amount of the minute protrusion 34 from the application surface 32 is set smaller than the projection amount of the sealing members 42 from the lower end of the filter 41. Thus, the projection amount of the sealing members 42 from the lower end of the filter 41 is greater than the projection amount of the minute protrusion 34 from the application surface 32. Thus, the distal end of the minute protrusion 34 does not contact the lower end of the filter 41, and the distance between the projecting parts of the sealing members 42 and the application surface 32 is reliably prevented from being increased. Thus, the filter element 40 is secured to the application surface 32 in a stable manner.

(5) The lower casing 30 is molded with the first to third molds 81 to 83, and the minute protrusion 34 is formed with the chamfered portion 813, which is formed on the parting surface 811 of the first mold 81, and the parting surface 821 of the second mold 82.

The lower casing 30 manufactured by the method as described above has an operational advantage similar to the above-described advantage (1). Furthermore, the above-described method has an operational advantage similar to the above-described advantage (3).

(6) The protrusion 24, which extends from the inner surface of the upper casing 20, is inserted into the adhesive 60. Thus, the filter element 40 and the upper casing 20 are both adhered to the lower casing 30 with the common adhesive 60.

Since the protrusion 24 of the upper casing 20 is inserted into the adhesive 60, the contact area between the adhesive 60 and the upper casing 20 is ensured without outwardly increasing the width of the region of the upper casing 20 that contacts the adhesive 60. Thus, while restraining an increase in the size of the air cleaner 10, the adhesion strength (shear strength, tensile strength) of the adhesive 60 to bond the upper casing 20 is ensured. Thus, the air cleaner 10 is easily assembled, and the size of the air cleaner 10 is restrained from increasing.

(7) Since the protrusion 24 is formed along the entire perimeter of the inner surface of the peripheral wall 22 of the upper casing 20, the contact area of the protrusion 24 that contacts the adhesive 60 is increased, and the adhesion strength of the adhesive 60 to bond the upper casing 20 is increased.

(8) Since the protrusion 24 is tapered toward the application surface 32, the protrusion 24 is smoothly inserted into the adhesive 60. Thus, when the protrusion 24 is inserted, the adhesive 60 is reliably restrained from bulging and flowing out of the application surface 32.

(9) The wall portion 33 projects from the outer side of the application surface 32 of the lower casing 30.

With this structure, the adhesive 60 applied to the application surface 32 of the lower casing 30 is restricted from moving outward by the wall portion 33. Thus, the adhesive 60 applied to the application surface 32 moves toward the opposite side, that is, toward the filter element 40, and easily enters between the pleats of the filter 41. As a result, the contact area between the filter 41 and the adhesive 60 is easily increased, and the adhesion strength of the adhesive 60 to bond the filter element 40 is increased.

(10) The wall portion 33 is covered with the peripheral wall 22 of the upper casing 20 from the outer perimeter, and a gap is formed between the wall portion 33 and the peripheral wall 22.

When the upper casing 20 and the lower casing 30 are assembled using the adhesive 60, the application amount of the adhesive 60 may vary. In particular, when the application amount of the adhesive 60 is great, some of the adhesive 60 may possibly be squeezed out through the gap between the outer side surface 241 of the protrusion 24 and the wall portion 33. In this respect, according to the present embodiment, the wall portion 33 is covered with the peripheral wall 22 of the upper casing 20 from the outer perimeter, and a gap is formed between the wall portion 33 and the peripheral wall 22. Thus, even if some of the adhesive 60 is squeezed out through the gap between the outer side surface 241 of the protrusion 24 and the wall portion 33, the adhesive 60 stays in the gap and is reliably prevented from being squeezed out. Thus, it is unnecessary to remove the adhesive 60 that has been squeezed out.

The above described embodiment may be modified as follows.

If a burr that functions as the minute protrusion can be formed with the parting surfaces 811, 821 of the first and second molds 81, 82, the chamfered portion 813 may be omitted.

The minute protrusion may be formed outward of the inner peripheral edge of the application surface 32.

The minute protrusion 34 may be provided partially along the perimeter.

The present invention may be applied to an air cleaner including a cylindrical filter element.

The lower end section 222 of the peripheral wall 22 of the upper casing 20 may be omitted, and a flange may be formed on the outer peripheral edge of the lower end of the upper section 221. That is, the wall portion 33 does not necessarily have to be covered with the peripheral wall 22 of the upper casing 20 from the outer perimeter.

The protrusion 24 of the upper casing 20 may be partially omitted along the perimeter. That is, the protrusion 24 may be provided partially along the perimeter.

The inlet 26 of the upper casing 20 may be used as an outlet, and the outlet 36 of the lower casing 30 may be used as an inlet. That is, the outlet may be formed in a first casing, and the inlet may be formed in a second casing.

Instead of the air cleaner 10, which is applied to the detection module 91 for detecting the presence/absence of leakage of fuel vapor from the fuel tank 93, the present invention may be applied to, for example, other air cleaners such as an air cleaner applied to a secondary air introduction apparatus, which introduces air into the exhaust pipe of an internal combustion engine.

The invention claimed is:

1. An air cleaner casing, comprising:
   a bottom wall having an outer peripheral portion;
   a looped application surface, on which an adhesive is applied to secure a filter element, the looped application surface provided on the outer peripheral portion of the bottom wall; and
   a minute protrusion, which is formed on an inner side of the application surface to extend along a perimeter of the looped application surface,
   wherein the minute protrusion is configured to restrain the adhesive from moving inward, and
   wherein the filter element is to be located on the adhesive applied on the looped application surface, and
   a protrusion configured to be inserted in the adhesive applied on the looped application surface.

2. The air cleaner casing according to claim 1, wherein the minute protrusion is formed along an entire perimeter of the application surface.

3. The air cleaner casing according to claim 1, wherein the minute protrusion is formed on an inner peripheral edge of the application surface.

4. An air cleaner comprising:
   a first casing, which includes an opening and one of an inlet and an outlet;
   a second casing, which includes the other of the inlet and the outlet, wherein the second casing covers the opening of the first casing; and
   a filter element, which is located inside the first casing and the second casing, wherein
   the second casing includes:
     a bottom wall having an outer peripheral portion;
     a looped application surface, on which an adhesive is applied to secure the filter element, the looped application surface provided on the outer peripheral portion of the bottom wall; and
     a minute protrusion, which is formed on an inner side of the application surface to extend along a perimeter of the looped application surface,
   wherein the minute protrusion is configured to restrain the adhesive from moving inward, and
   wherein the filter element is located on the adhesive applied on the looped application surface; and
   the first casing includes a protrusion extending therefrom, wherein the protrusion is inserted in the adhesive applied on the looped application surface.

5. The air cleaner according to claim 4, wherein the filter element includes:
   a rectangular filter having a plurality of pleats; and
   a sealing member, which is located between the pleats on the surface of the filter opposed to the second casing to seal end portions in an extending direction of ridges of the pleats, wherein
   the sealing member projects toward the application surface from the end portion of the filter on which the sealing member is provided, and
   the projection amount of the minute protrusion from the application surface is set smaller than the projection amount of the sealing member from the end portion of the filter.

6. The air cleaner according to claim 4, wherein the minute protrusion is formed along an entire perimeter of the application surface.

7. The air cleaner according to claim 4, wherein the minute protrusion is formed on an inner peripheral edge of the application surface.

8. A method for manufacturing an air cleaner casing including a bottom wall having an outer peripheral portion, a looped application surface, on which an adhesive is applied to secure a filter element, the looped application surface provided on the outer peripheral portion of the bottom wall, the method comprising:
   molding the casing with a mold; and
   forming a minute protrusion, which extends along a perimeter of the looped application surface, on an inner side of the looped application surface with a parting surface of the mold when molding the casing, wherein the minute protrusion is configured to restrain the adhesive from moving inward, and
   wherein the filter element is to be located on the adhesive applied on the looped application surface, and
   forming a protrusion extending from the casing, wherein the protrusion is configured to be inserted in the adhesive applied on the looped application surface.

* * * * *